United States Patent
Fujishita (10) Patent No.: US 11,046,805 B2
(45) Date of Patent: *Jun. 29, 2021

(54) METHOD FOR PRODUCING COAGULATE

(71) Applicant: DIC Corporation, Tokyo (JP)

(72) Inventor: Norie Fujishita, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/304,651

(22) PCT Filed: Apr. 25, 2017

(86) PCT No.: PCT/JP2017/016301
§ 371 (c)(1),
(2) Date: Nov. 26, 2018

(87) PCT Pub. No.: WO2017/208680
PCT Pub. Date: Dec. 7, 2017

(65) Prior Publication Data
US 2019/0211133 A1    Jul. 11, 2019

(30) Foreign Application Priority Data

Jun. 1, 2016  (JP) .............................. JP2016-110098

(51) Int. Cl.
| | | |
|---|---|---|
| C08G 18/08 | (2006.01) |
| C08L 75/04 | (2006.01) |
| C08K 5/00 | (2006.01) |
| C08J 3/20 | (2006.01) |
| C08J 9/26 | (2006.01) |
| C08K 3/10 | (2018.01) |
| C08J 9/00 | (2006.01) |
| C08K 5/06 | (2006.01) |
| C08G 85/00 | (2006.01) |
| C08J 3/205 | (2006.01) |
| C08K 5/098 | (2006.01) |

(52) U.S. Cl.
CPC ............ *C08G 18/14* (2013.01); *C08G 85/002* (2013.01); *C08J 3/20* (2013.01); *C08J 3/205* (2013.01); *C08J 9/0061* (2013.01); *C08J 9/26* (2013.01); *C08K 3/10* (2013.01); *C08K 5/00* (2013.01); *C08K 5/06* (2013.01); *C08K 5/098* (2013.01); *C08L 75/04* (2013.01); *C08J 2201/0444* (2013.01); *C08J 2375/04* (2013.01); *C08J 2401/02* (2013.01)

(58) Field of Classification Search
CPC .......... C08G 18/14; C08G 85/002; C08J 3/20; C08J 9/26; C08J 9/0061; C08J 3/205; C08J 2401/02; C08J 2201/0444; C08J 2375/04; C08K 5/00; C08K 5/098; C08K 5/06; C08K 3/10; C08L 75/04

See application file for complete search history.

(56) References Cited

U.S. PATENT DOCUMENTS

| | | |
|---|---|---|
| 5,352,711 A | 10/1994 | DesMarais |
| 2004/0121113 A1 | 6/2004 | Mobley et al. |
| 2006/0189240 A1 | 8/2006 | Taylor et al. |
| 2007/0204381 A1 | 9/2007 | Thompson et al. |
| 2009/0247671 A1 | 10/2009 | Hong |
| 2011/0209504 A1 | 9/2011 | Thompson et al. |
| 2014/0163164 A1* | 6/2014 | Nagahama ......... C08G 18/7621 524/590 |
| 2016/0073713 A1 | 3/2016 | Takata |
| 2016/0208432 A1 | 7/2016 | Tetsui |
| 2017/0156422 A1 | 6/2017 | Honjo |
| 2018/0208722 A1 | 7/2018 | Tetsui et al. |
| 2019/0276629 A1* | 9/2019 | Fujishita ................. C08J 9/283 |

FOREIGN PATENT DOCUMENTS

| | | |
|---|---|---|
| CN | 104497258 A | 4/2015 |
| GB | 1244429 A | 9/1971 |
| JP | S60-122760 A | 7/1985 |
| JP | H02-19503 A | 1/1990 |
| JP | 2000-160484 A | 6/2000 |
| JP | 2001-011254 A | 1/2001 |
| JP | 2001-123306 A | 5/2001 |
| JP | 2002-249985 A | 9/2002 |
| JP | 2005-273083 A | 10/2005 |

(Continued)

OTHER PUBLICATIONS

Machine English translation to JP 2006-096852, Yoshiyuki, Apr. 13, 2006.*
International Search Report issued in corresponding International Patent Application No. PCT/JP2017/016301, dated Jul. 25, 2017, with English Translation.
International Search Report issued in corresponding International Patent Application No. PCT/JP2017/016302, dated Aug. 1, 2017, with English Translation.
International Search Report issued in corresponding International Patent Application No. PCT/JP2018/029886, dated Sep. 11, 2018, with English Translation.
International Search Report issued in corresponding International Patent Application No. PCT/JP2018/029885 dated Nov. 6, 2018, with English Translation.

(Continued)

*Primary Examiner* — Patrick D Niland
(74) *Attorney, Agent, or Firm* — McDermott Will & Emery LLP (57) ABSTRACT

A method for producing a coagulate includes: incorporating, into an aqueous urethane resin composition containing an aqueous urethane resin having an acid value of 0.01 mg KOH/g or more, a thickening agent having an oxyethylene group content of $2 \times 10^{-2}$ mol/g or less in an amount in the range of from 0.01 to 30 parts by mass, relative to 100 parts by mass of the aqueous urethane resin, to thicken the composition; and then coagulating the thickened composition using a coagulant containing a metal salt). A porous structure can be formed from an aqueous urethane resin composition without subjecting the composition to heating or foaming step, and therefore a coagulate having a porous structure can be stably obtained with ease.

1 Claim, 1 Drawing Sheet

(56) References Cited

FOREIGN PATENT DOCUMENTS

| | | | |
|---|---|---|---|
| JP | 2006-096852 A | 4/2006 |
| JP | 2006-511727 A | 4/2006 |
| JP | 2006-524754 A | 11/2006 |
| JP | 2009-527658 A | 7/2009 |
| JP | 2010-215903 A | 9/2010 |
| JP | 2013-023691 A | 2/2013 |
| JP | 2013-060683 A | 4/2013 |
| JP | 2013-083031 A | 5/2013 |
| JP | 2016-060970 A | 4/2016 |
| JP | 2017-025423 A | 2/2017 |
| JP | 2017-036516 A | 2/2017 |
| JP | 2017-105917 A | 6/2017 |
| JP | 2017-106152 A | 6/2017 |
| WO | 2015/146334 A1 | 10/2015 |
| WO | 2017/013926 A1 | 1/2017 |

OTHER PUBLICATIONS

"Methyl cellulose," Chemical Book. http://www.chemicalbook.com/Chemical ProductProperty_EN_CB3474718.htm (Year: 2017).
Extended European Search Report issued in corresponding European Patent Application No. 188559645, dated Oct. 12, 2020.

\* cited by examiner

//  METHOD FOR PRODUCING COAGULATE

CROSS REFERENCE TO RELATED APPLICATIONS

This application is the U.S. National Phase under 35 U.S.C. § 371 of International Application No. PCT/W2017/016301, filed on Apr. 25, 2017, which claims the benefit of Japanese Application No. 2016-410098, filed on Jun. 1, 2016, the entire contents of each are hereby incorporated by reference.

TECHNICAL FIELD

The present invention relates to a method for producing a coagulate having a porous structure.

BACKGROUND ART

As the use of organic solvents including dimethylformamide (DMF) is increasingly strictly regulated in the European countries and China, aqueous urethane resin compositions are more frequently used in the fields of leather-like sheets, such as an artificial leather and a synthetic leather, gloves, coating agents, adhesives and the like.

In processing the aqueous urethane resin composition, for the purpose of improving the resultant processed products in texture, impact resistance and the like, a method is widely used in which the composition is subjected to special treatment so that the resultant product has a porous structure. For example, PTL 1 discloses a method in which an aqueous urethane resin composition is applied to a substrate and then subjected to heating treatment using wet heat and microwaves in combination to form a porous structure. PTL 2 discloses a method in which a porous structure is formed from an aqueous urethane resin composition by heating using wet heat heating by steam and high-frequency heating or high-frequency induction heating in combination, or the like. PTL 3 discloses a method in which a fiber substrate is impregnated with an aqueous urethane resin composition and then subjected to thermal gellation treatment to form a porous structure.

In addition, other methods are disclosed in which foam is included in an aqueous urethane resin composition by mechanical foaming or the like, and then the resultant composition is subjected to coagulation, dried and the like to form a porous film (see, for example, PTL's 4 to 7).

The above-mentioned documents are only a part of the examples, and a great number of other studies have been made on the formation of a porous structure from the aqueous urethane resin composition. However, a porous structure has not been able to be formed unless the composition is subjected to a cumbersome treatment, such as a heating or foaming step.

CITATION LIST

Patent Literature

PTL 1: JP-A-2000-160484
PTL 2: JP-A-2002-249985
PTL 3: JP-A-2013-083031
PTL 4: JP-A-2005-273083
PTL 5: JP-T-2006-511727 (the term "JP-T" as used herein means a published Japanese translation of a PCT patent application)
PTL 6: JP-T-2006-524754
PTL 7: JP-T-2009-527658

SUMMARY OF INVENTION

Technical Problem

A task to be achieved by the present invention is to provide a method for producing a coagulate having a porous structure with ease using an aqueous urethane resin composition without subjecting the composition to a step of heating, foaming, or the like.

Solution to Problem

According to the present invention, there is provided a method for producing a coagulate, comprising: incorporating, into an aqueous urethane resin composition containing an aqueous urethane resin (A) having an acid value of 0.01 mg KOH/g or more, a thickening agent (B) having an oxyethylene group content of $2 \times 10^{-2}$ mol/g or less in an amount in the range of from 0.01 to 30 parts by mass, relative to 100 parts by mass of the aqueous urethane resin (A), to thicken the composition; and then coagulating the thickened composition using a coagulant (C) containing a metal salt (c-1).

Advantageous Effects of Invention

By the method of the invention, a porous structure can be formed from an aqueous urethane resin composition without subjecting the composition to heating or foaming step, and therefore a coagulate having a porous structure can be stably obtained with ease. In the invention, the term "porous" indicates having a number of very small pores.

DESCRIPTION OF EMBODIMENTS

It is necessary that a method for producing a coagulate of the invention comprise incorporating, into an aqueous urethane resin composition containing an aqueous urethane resin (A) having an acid value of 0.01 mg KOH/g or more, a thickening agent (B) having an oxyethylene group content of $2 \times 10^{-2}$ mol/g or less in an amount in the range of from 0.01 to 30 parts by mass, relative to 100 parts by mass of the aqueous urethane resin (A), to thicken the composition, and then coagulating the thickened composition using a coagulant (C) containing a metal salt (c-1).

With respect to the aqueous urethane resin (A) used in the invention, the use of the aqueous urethane resin having an acid value of 0.01 mg KOH/g or more is essential for obtaining a porous structure with ease. It is considered that, by virtue of the acid value of the aqueous urethane resin (A) in the above range, the synthesized aqueous urethane resin is stable and further can be easily coagulated using the coagulant (C), making it possible to form an excellent porous structure. From the viewpoint of obtaining more excellent porous structure, the acid value is preferably in the range of from 0.01 to 70 mg KOH/g, more preferably in the range of from 1 to 50 mg KOH/g, further preferably in the range of from 3 to 40 mg KOH/g, especially preferably in the range of from 6 to 30 mg KOH/g. The method for measuring the acid value of the aqueous urethane resin (A) is described in the Examples below.

The aqueous urethane resin (A) has the above-mentioned acid value, and, specifically, has a structure derived from an anionic group, such as a carboxyl group or a sulfonic group. As the aqueous urethane resin (A), for example, a reaction product of a polyol (a-1), a compound (a-2) giving an anionic group, a chain extender (a-3), and a polyisocyanate (a-4) can be used.

As the polyol (a-1), for example, polyether polyol, polycarbonate polyol, polyester polyol, polyacrylic polyol, polybutadiene polyol, castor oil polyol, or the like can be used. These polyols (a-1) may be used individually or in any combination. Of these, from the viewpoint of enabling more stable formation of a porous structure, at least one polyol selected from the group consisting of a polyether polyol, a polycarbonate polyol, and a polyester polyol is preferably used.

From the viewpoint of the flexibility and the production stability of the aqueous urethane resin, the number average molecular weight of the polyol (a-1) is preferably in the range of from 500 to 15,000, more preferably in the range of from 600 to 10,000, further preferably in the range of from 700 to 8,000, especially preferably in the range of from 800 to 5,000. The number average molecular weight of the polyol (a-1) is a value measured by a gel permeation chromatography (GPC) method under the conditions shown below.

Measuring apparatus: High-speed GPC apparatus ("HLC-8220GPC", manufactured by Tosoh Corp.)

Columns: The columns shown below, manufactured by Tosoh Corp., which are connected in series were used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column temperature: 40° C.
Eluent: Tetrahydrofuran (THF)
Flow rate: 1.0 mL/minute
Sample amount per injection: 100 μL (tetrahydrofuran solution having a sample concentration of 0.4% by mass)
Standard sample: A calibration curve was prepared using the standard polystyrenes shown below.
(Standard polystyrenes)
"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

As the compound (a-2) giving an anionic group, there can be used, for example, a compound having a carboxyl group, such as 2,2-dimethylolpropionic acid, 2,2-dimethylolbutanoic acid, 2,2-dimethylolbutyric acid, or 2,2-valeric acid; a compound having a sulfonyl group, such as 3,4-diaminobutanesulfonic acid, 3,6-diamino-2-toluenesulfonic acid, 2,6-diaminobenzenesulfonic acid, or N-(2-aminoethyl)-2-aminoethylsulfonic acid, or the like. These compounds may be used individually or in any combination. Of these, from the viewpoint of enabling formation of more excellent porous structure due to excellent reactivity with the coagulant (C), a compound having a carboxyl group is preferably used.

A part of or all of the anionic group may be neutralized with a basic compound in the aqueous urethane resin composition. As the basic compound, there can be used, for example, ammonia; an organic amine, such as triethylamine, pyridine, or morpholine; an alkanolamine, such as monoethanolamine; or a metal basic compound containing sodium, potassium, lithium, calcium, or the like.

The chain extender (a-3) has a number average molecular weight in the range of from 50 to 490, and there can be used, for example, a chain extender having an amino group, such as ethylenediamine, 1,2-propanediamine, 1,6-hexamethylenediamine, piperazine, 2,5-dimethylpiperazine, isophorone diamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, or hydrazine; a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, or trimethylolpropane, or the like. These chain extenders may be used individually or in any combination. From the viewpoint of the mechanical strength of the coagulate, the amount of the chain extender (a-3) used is preferably in the range of from 0.01 to 8% by mass, more preferably in the range of from 0.01 to 5% by mass, based on the total mass of the raw materials for the aqueous urethane resin (A).

As the polyisocyanate (a-4), there can be used, for example, an aromatic polyisocyanate, such as phenylene diisocyanate, toluene diisocyanate, diphenylmethane diisocyanate, naphthalene diisocyanate, polymethylene polyphenyl polyisocyanate, or carbodiimide-modified diphenylmethane polyisocyanate; an aliphatic or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate, or the like. These polyisocyanates may be used individually or in any combination.

The aqueous urethane resin (A) can be produced by, for example, mixing the polyol (a-1), the compound (a-2) giving an anionic group, the chain extender (a-3), and the polyisocyanate (a-4) in the absence of a solvent or in the presence of an organic solvent to perform a urethane forming reaction, for example, at a temperature of 50 to 100° C. for 3 to 10 hours.

Alternatively, the aqueous urethane resin (A) can be produced by, for example, mixing the polyol (a-1), the compound (a-2) giving an anionic group, and the polyisocyanate (a-4) in the absence of a solvent or in the presence of an organic solvent to perform a reaction, for example, at a temperature of 50 to 100° C. for 3 to 10 hours, obtaining a urethane prepolymer having an isocyanate group at the molecular end thereof, and then reacting the urethane prepolymer with the chain extender (a-3)

In the reaction of the polyol (a-1), the compound (a-2) giving an anionic group, the chain extender (a-3), and the polyisocyanate (a-4), the [isocyanate group/(hydroxyl group+amino group)] (molar ratio) is preferably in the range of from 0.9 to 1.1, more preferably in the range of from 0.93 to 1.05.

With respect to the organic solvent usable in producing the aqueous urethane resin (A), there can be used, for example, a ketone solvent, such as acetone or methyl ethyl ketone; an ether solvent, such as tetrahydrofuran or dioxane; an acetate solvent, such as ethyl acetate or butyl acetate; a nitrile solvent, such as acetonitrile; an amide solvent, such as dimethylformamide or N-methylpyrrolidone, or the like. The organic solvents may be used individually or in any combination.

From the viewpoint of preventing formation of precipitate, the average particle diameter of the aqueous urethane resin (A) is preferably in the range of from 0.01 to 1 µm, more preferably in the range of from 0.05 to 0.9 µm. The method for measuring the average particle diameter of the aqueous urethane resin (A) is described in the Examples below.

From the viewpoint of physical properties of the resultant processed article, such as flexibility and a strength, and processability, the weight average molecular weight of the aqueous urethane resin (A) is preferably in the range of from 10,000 to 1,000,000, more preferably in the range of from 30,000 to 500,000. The weight average molecular weight of the aqueous urethane resin (A) indicates a value obtained by conducting measurement in the same manner as in the measurement made for the number average molecular weight of the polyol (a-1).

From the viewpoint of obtaining excellent viscosity and application operation properties, the content of the aqueous urethane resin (A) in the aqueous urethane resin composition is preferably in the range of from 10 to 60% by mass, more preferably in the range of from 20 to 50% by mass.

From the viewpoint of the application properties and storage stability, the aqueous urethane resin composition preferably contains an aqueous medium (Z) in addition to the aqueous urethane resin (A).

As the aqueous medium (Z), for example, water, an organic solvent miscible with water, a mixture thereof or the like can be used. As the organic solvent miscible with water, there can be used, for example, an alcohol solvent, such as methanol, ethanol, n-propanol, or isopropanol; a ketone solvent, such as acetone or methyl ethyl ketone; a polyalkylene glycol solvent, such as ethylene glycol, diethylene glycol, or propylene glycol; an alkyl ether solvent, such as a polyalkylene polyol; a lactam solvent, such as N-methyl-2-pyrrolidone, or the like. Of these, water is preferably used from the viewpoint of the environmental properties.

As a method for producing the aqueous urethane resin composition, for example, there can be mentioned a method in which the aqueous urethane resin (A) is produced in the absence of a solvent or in the presence of the above-mentioned organic solvent, and then, if necessary, the anionic group in the aqueous urethane resin (A) is neutralized, and then the aqueous medium (Z) is fed to disperse the aqueous urethane resin (A) in the aqueous medium (Z).

When the aqueous urethane resin (A) and the aqueous medium (Z) are mixed with each other, if necessary, a machine, such as a homogenizer, may be used.

Further, when producing the aqueous urethane resin composition, in view of improving the dispersion stability of the aqueous urethane resin (A) in the aqueous medium (Z), an emulsifying agent may be used.

As the emulsifying agent, there can be used, for example, a nonionic emulsifying agent, such as polyoxyethylene nonyl phenyl ether, polyoxyethylene lauryl ether, polyoxyethylene styryl phenyl ether, polyoxyethylene sorbitol tetraoleate, or a polyoxyethylene-polyoxypropylene copolymer; an anionic emulsifying agent, such as a fatty acid salt, e.g., sodium oleate, an alkylsulfate salt, an alkylbenzenesulfonic acid salt, an alkylsulfosuccinic acid salt, a naphthalenesulfonic acid salt, a polyoxyethylene alkylsulfuric acid salt, a sodium alkanesulfonate, or a sodium alkyldiphenyl ether sulfonate; a cationic emulsifying agent, such as an alkylamine salt, an alkyltrimethylammonium salt, or an alkyldimethylbenzylammonium salt, or the like. These emulsifying agents may be used individually or in any combination.

The aqueous polyurethane composition may contain another additive in addition to the aqueous urethane resin (A) and the aqueous medium (Z).

As the additive, for example, an anti-foaming agent, a urethane formation catalyst, a silane coupling agent, a filler, a wax, a heat stabilizer, a light stabilizer, a pigment, a dye, an antistatic agent, an oil repellent agent, a flame retardant, an anti-blocking agent, or the like can be used. These additives may be used individually or in any combination.

In the invention, it is necessary that the aqueous urethane resin composition be thickened using the thickening agent (B) having an oxyethylene group content of $2 \times 10^{-2}$ mol/g or less. This indicates that the thickening agent (B) is relatively unlikely to be dissolved in the aqueous medium (Z), and, by virtue of this, it is considered that the thickening agent remaining in the aqueous urethane resin (A) forms voids upon being dried when obtaining a coagulate, making it possible to easily form a porous structure. In contrast, in the case where a thickening agent having an oxyethylene group content of more than $2 \times 10^{-2}$ mol/g is used, it is considered that the thickening agent is highly water-soluble and hence does not cause the above-mentioned formation of voids, so that a porous structure is not formed. From the viewpoint of enabling formation of more excellent porous structure, the oxyethylene group content of the thickening agent (B) is preferably $1.8 \times 10^{-2}$ mol/g or less, more preferably $1.7 \times 10^{-2}$ mol/g or less. In the determination of the oxyethylene group content of the thickening agent (B), the oxyethylene group content is determined using the total molar number of the oxyethylene group [$CH_2CH_2O$], based on the total mass of the all compounds contained in the thickening agent (B), except for the solvent. For example, when a urethane thickening agent containing a urethane compound, an additive, such as an emulsifying agent, and water is used as the thickening agent (B), the oxyethylene group content is determined from the total molar number of the oxyethylene group in the urethane compound and the additive, based on the total mass of the all compounds contained in the thickening agent, except for water, that is, the total mass of the urethane compound and the additive.

Further, in the invention, it is necessary that the thickening agent (B) be incorporated into the aqueous urethane resin composition in an amount in the range of from 0.01 to 30 parts by mass, relative to 100 parts by mass of the aqueous urethane resin (A) (in terms of a solids content). When the amount of the thickening agent (B) incorporated is less than 0.01 part by mass, a problem is caused in that a desired thickening effect cannot be obtained, so that the application properties become poor, or a problem is caused in that a porous structure cannot be formed. When the amount of the thickening agent (B) incorporated is more than 30 parts by mass, not only cannot a porous structure be formed, but also an industrially usable film cannot be obtained due to embrittlement. From the viewpoint of obtaining more excellent porous structure, the amount of the thickening agent (B) incorporated, relative to 100 parts by mass of the aqueous urethane resin (A), is preferably in the range of from 0.1 to 20 parts by mass, more preferably in the range of from 0.15 to 10 parts by mass, further preferably in the range of from 0.2 to 7 parts by mass. The amount of the thickening agent (B) incorporated is determined in terms of a solids content. For example, when carboxymethyl cellulose diluted with water is used as the thickening agent (B), the amount of the thickening agent (B) incorporated is calculated from the amount of the carboxymethyl cellulose per se used. Further, for example, when a urethane thickening agent containing a urethane compound, an additive, such as an emulsifying agent, and water is used as the thickening agent (B), the amount of the thickening agent (B) incorporated is calculated from the total mass of the thickening agent, except for water, that is, the total mass of the urethane compound and the additive.

As the thickening agent (B), specifically, there can be used, for example, a cellulose thickening agent; an acrylic thickening agent; a urethane thickening agent; a protein thickening agent, such as casein, sodium caseinate, or ammonium caseinate; a polyvinyl thickening agent, such as polyvinyl alcohol, polyvinyl pyrrolidone, or a polyvinyl benzyl ether copolymer; a polyether thickening agent, such as Pluronic polyether, a polyether dialkyl ester, a polyether dialkyl ether, or a polyether epoxy modification product; a maleic anhydride thickening agent, such as a vinylmethyl ether-maleic anhydride copolymer; a polyamide thickening agent, such as a polyamide amine salt, or the like. These thickening agents may be used individually or in any combination. When the thickening agent (B) is incorporated into the aqueous urethane resin composition, the thickening agent (B) may be used in the form of being diluted with an aqueous medium or the like. With respect to the thickening agent (B), among those mentioned above, a cellulose thickening agent and/or a urethane thickening agent is preferably used because the blend containing the aqueous urethane resin (A) and thickening agent (B) is in a dispersed state that is suitable for the formation of a porous structure, enabling formation of more excellent porous structure.

As the cellulose thickening agent, for example, carboxymethyl cellulose, methyl cellulose, hydroxyethyl cellulose, or the like can be used. These thickening agents may be used individually or in any combination. Of these, methyl cellulose is preferably used because the blend containing the aqueous urethane resin (A) and thickening agent (B) is in a dispersed state that is suitable for the formation of a porous structure, enabling formation of more excellent porous structure.

As the urethane thickening agent, for example, a urethane thickening agent containing a urethane compound which is a reaction product of an oxyalkylene polyol and polyisocyanate can be used.

As the oxyalkylene polyol, for example, a polymerization product of a polyhydric alcohol and an alkylene oxide can be used.

As the polyhydric alcohol, there can be used, for example, a glycol, such as ethylene glycol, 1,2-propylene glycol, 1,3-propylene glycol, 1,3-butylene glycol, 1,4-butylene glycol, 1,5-pentanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, or cyclohexane-1,4-dimethanol; polyester polyol, or the like. These compounds may be used individually or in any combination.

As the alkylene oxide, for example, ethylene oxide, propylene oxide, butylene oxide, styrene oxide, or the like can be used. These compounds may be used individually or in any combination.

With respect to the oxyalkylene polyol, among those mentioned above, from the viewpoint of the production stability and thickening properties, polyethylene glycol is preferably used.

From the viewpoint of improving the working properties upon preparing the blend, the number average molecular weight of the polyoxyalkylene polyol is preferably in the range of from 2,000 to 12,000, more preferably in the range of from 2,500 to 10,000. The number average molecular weight of the polyoxyalkylene polyol indicates a value obtained by conducting measurement in the same manner as in the measurement made for the number average molecular weight of the polyol (a1).

The polyoxyalkylene polyol and another polyol may be used in combination if necessary. As such another polyol, for example, polycarbonate polyol, polyester polyol, polyacrylic polyol, polybutadiene polyol, or the like can be used. These polyols may be used individually or in any combination.

As the polyisocyanate, there can be used, for example, an aromatic polyisocyanate, such as phenylene diisocyanate, toluene diisocyanate, diphenylmethane diisocyanate, naphthalene diisocyanate, polymethylene polyphenyl polyisocyanate, or carbodiimide-modified diphenylmethane polyisocyanate; an aliphatic or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate, or the like. These polyisocyanates may be used individually or in any combination. Of these, from the viewpoint of enabling formation of more excellent porous structure, an aliphatic or alicyclic polyisocyanate is preferably used, and hexane diisocyanate is further preferably used.

In the urethane compound, a compound having a hydroxyl group or an amino group and a hydrophobic group may be further used so that the urethane compound has a hydrophobic group at the end thereof.

As the compound having a hydroxyl group or an amino group and a hydrophobic group, there can be used, for example, a branched aliphatic alcohol, such as 2-butyl-1-octanol, 2-butyl-1-decanol, 2-hexyl-1-octanol, 2-hexyl-1-decanol, isononyl alcohol, isodecyl alcohol, or isoundecyl alcohol; a linear aliphatic alcohol, such as 1-hexadecanol, 1-tetradecanol, 1-dodecanol, 1-undecanol, 1-decanol, 1-nonanol, 1-octanol, or 1-hexanol; an alkylaryl alcohol, such as nonylphenol or tristyrylphenol; an aliphatic amine, such as 1-decylamine, 1-octylamine, 1-hexylamine, dioctylamine, or dihexylamine; a polyalkylene glycol monoalkyl ether, such as a polyethylene glycol monoalkyl ether (in which the alkyl group has 8 to 24 carbon atoms) or a polypropylene glycol monoalkyl ether (in which the alkyl group has 8 to 24 carbon atoms); a polyalkylene glycol monoalkylphenyl ether, such as a polyethylene glycol monoalkylphenyl ether (in which the alkyl group has 8 to 24 carbon atoms) or a polypropylene glycol monoalkylphenyl ether (in which the alkyl group has 8 to 24 carbon atoms), or the like.

From the viewpoint of enabling formation of more excellent porous structure, the weight average molecular weight of the urethane compound is preferably in the range of from 2,000 to 100,000, more preferably in the range of from 10,000 to 90,000, further preferably in the range of from 20,000 to 80,000. The weight average molecular weight of the urethane compound indicates a value obtained by conducting measurement in the same manner as in the measurement made for the number average molecular weight of the polyol (a1).

The urethane thickening agent may contain an additive in addition to the urethane compound. As the additive, for example, an aqueous medium, an emulsifying agent, an anti-foaming agent, a dispersant, or the like can be used. These additives may be used individually or in any combination. As the emulsifying agent, for example, an emulsifying agent similar to the emulsifying agent usable in producing the aqueous urethane resin composition can be used.

In the case where a urethane thickening agent is used as the thickening agent (B), as a method for controlling the oxyethylene group content, for example, there can be mentioned a method in which a polyoxyalkylene polyol as a raw material having a reduced oxyethylene group content is used, a method in which the amount of the polyethylene glycol used is reduced, a method in which an emulsifying agent having a reduced oxyethylene group content is used, and a method in which the amount of the emulsifying agent having an oxyethylene group used is reduced.

In thickening the aqueous urethane resin composition using the thickening agent (B), from the viewpoint of obtaining more excellent porous structure, the aqueous urethane resin composition containing the thickening agent (B) is preferably thickened so as to have a viscosity of 400 mPa·s or more, more preferably a viscosity in the range of from 450 to 10,000 mPa·s, further preferably a viscosity in the range of from 500 to 8,000 mPa·s. With respect to the measurement method for the viscosity of the aqueous urethane resin composition (containing the thickening agent) after being thickened, the viscosity indicates a value measured at 25° C. using a Brookfield viscometer (M3 rotor, 30 revolutions). After the thickening, the resultant aqueous urethane resin composition is preferably deaerated using a deaerator or the like and then subjected to the below-mentioned salt coagulation.

With respect to the method for thickening the aqueous urethane resin composition using the thickening agent (B), the thickening agent (B) and the aqueous urethane resin composition may be in contact with each other, and, for example, there can be mentioned a method of mixing the thickening agent (B) and the aqueous urethane resin composition with each other. In the mixing, a stirring rod, a mechanical mixer, or the like can be used. After the thickening, the resultant aqueous urethane resin composition is preferably deaerated using a deaerator or the like and then subjected to the below-mentioned salt coagulation.

Then, the thickened aqueous urethane resin composition is coagulated using the coagulant (C) containing the metal salt (c-1).

As the metal salt (c-1), for example, calcium nitrate, calcium chloride, zinc nitrate, zinc chloride, magnesium acetate, aluminum sulfate, sodium chloride, or the like can be used. These metal salts may be used individually or in any combination. Of these, calcium nitrate is preferably used from the viewpoint of further improvement of the coagulation properties due to large electrical double layer compression effect.

The coagulant (C) may contain a solvent in addition to the metal salt (c-1).

As the solvent, there can be used, for example, an aqueous medium similar to the aqueous medium (Z); an alcohol solvent, such as methanol, ethanol, 1-propanol, 2-propanol, 1-butanol, 2-butanol, 2-methyl-2-propanol, 1-pentanol, 2-pentanol, 2-methyl-2-butanol, 1-hexanol, 2-hexanol, cyclohexanol, 2-methyl-2-pentanol, or 3-methyl-3-pentanol, or the like.

From the viewpoint of achieving excellent salt coagulation, the content of the metal salt (c-1) in the coagulant (C) is preferably in the range of from 1 to 40% by mass, more preferably in the range of from 2 to 30% by mass.

A specific example of the method for producing a coagulate of the invention is described below.

As the method for producing a coagulate, for example, there can be mentioned a method in which the aqueous urethane resin composition is thickened using the thickening agent (B), and then the thickened aqueous urethane resin composition is applied to a substrate, or a substrate is immersed in the thickened aqueous urethane resin composition, and then the resultant substrate is further immersed in the coagulant (C), followed by drying, to produce a coagulate; and a method in which the coagulant (C) is applied to a substrate, or a substrate is immersed in the coagulant (C), and then the thickened aqueous urethane resin composition is further applied to the resultant substrate, or the resultant substrate is immersed in the thickened aqueous urethane resin composition, followed by drying, to produce a coagulate. These methods can be appropriately selected depending on the substrate and the application in which the coagulate is used.

As the substrate, there can be used, for example, a fiber substrate, such as nonwoven fabric, woven fabric, or knitted fabric; a wooden substrate, such as a board, an MDF (medium density fiber board), or a particle board; a metal substrate of aluminum, iron or the like; a plastic substrate, such as a polycarbonate substrate, a cycloolefin resin substrate, an acrylic resin substrate, a silicone resin substrate, an epoxy resin substrate, a fluororesin substrate, a polystyrene resin substrate, a polyester resin substrate, a polysulfone resin substrate, a polyarylate resin substrate, a polyvinyl chloride resin substrate, a polyvinylidene chloride substrate, an amorphous polyolefin resin substrate, a polyimide resin substrate, an alicyclic polyimide resin substrate, a cellulose resin substrate, a TAC (triacetyl cellulose) substrate, a COP (cycloolefin polymer) substrate, a PC (polycarbonate) substrate, a PBT (polybutylene terephthalate) substrate, a modified PPE (polyphenylene ether) substrate, a PEN (polyethylene naphthalate) substrate, a PET (polyethylene terephthalate) substrate, or a polylactic acid polymer substrate; a release-treated plastic substrate; a glass plate, or the like. The substrate may have a portion of a complicated shape, such as a groove portion, an R portion, or an inverted R portion.

As a method for applying the thickened aqueous urethane resin composition to the substrate, for example, there can be mentioned a knife coater method, a spraying method, a curtain coater method, a flow coater method, a roll coater method, and a brushing method. The thickness of the composition applied in the above method is appropriately selected depending on the application in which the coagulate is used, but, for example, the thickness is in the range of from 10 to 2,000 μm. Further, as a method for immersing in the coagulant (C) the coated substrate to which the aqueous urethane resin composition is applied, for example, there can be mentioned a method in which the coated substrate is directly immersed in a bath storing therein the coagulant (C) to cause salt coagulation to proceed. In this method, the immersion or coagulation time is, for example, 1 second to 30 minutes.

As a method for immersing the substrate in the coagulant (C), for example, there can be mentioned a method in which the substrate is directly immersed in a bath storing therein the coagulant (C). The immersion time is, for example, 1 second to 5 minutes. Further, as a method for immersing the immersed substrate in the thickened aqueous urethane resin composition, for example, there can be mentioned a method in which the immersed substrate is directly immersed in a bath storing therein the thickened aqueous urethane resin composition to cause salt coagulation to proceed. In this method, the immersion or coagulation time is, for example, 1 second to 10 minutes.

After the coagulate is obtained, if necessary, the coagulate may be, for example, immersed in water for 10 minutes to 8 hours, or exposed to running water to wash and remove the unnecessary coagulant. Further, after then, for example, the coagulate may be hot-air dried at 60 to 120° C. for 1 minute to 3 hours.

As described above, by the method of the invention, a porous structure can be formed from an aqueous urethane resin composition without subjecting the composition to heating or foaming step, and therefore a coagulate having a porous structure can be stably obtained with ease.

EXAMPLES

Hereinbelow, the present invention will be described in more detail with reference to the following Examples.

[Preparation Example 1] Preparation of Aqueous Urethane Resin Composition (X-1)

In a vessel equipped with a thermometer, a nitrogen gas introducing pipe, and a stirrer and purged with nitrogen gas, 500 parts by mass of polytetramethylene ether glycol (number average molecular weight: 2,000), 25 parts by mass of 2,2'-dimethylolpropionic acid (hereinafter, abbreviated to "DMPA"), and 128 parts by mass of dicyclohexylmethane diisocyanate (hereinafter, abbreviated to "$H_{12}MDI$") were reacted at 70° C. in the presence of 620 parts by mass of methyl ethyl ketone until a point in time when the NCO % of the reaction product reached a predetermined NCO %, obtaining a methyl ethyl ketone solution of a urethane prepolymer having an isocyanate group at the end thereof.

Then, 23 parts by mass of triethylamine was added as a neutralizing agent to the above-obtained organic solvent solution of the urethane prepolymer and the resultant mixture was stirred, and further 830 parts by mass of water was added to the mixture, followed by stirring, to obtain an emulsion having the urethane prepolymer dispersed in water.

The obtained emulsion and 3.2 parts by mass of an aqueous chain extender solution containing 2.6 parts by mass of hydrazine were mixed with each other to cause a chain extension reaction, obtaining a water dispersion of a urethane resin (A-1). Then, the obtained water dispersion was subjected to desolvation to obtain an aqueous urethane resin composition (X-1) having a nonvolatile content of 30% by mass.

[Preparation Example 2] Preparation of Aqueous Urethane Resin Composition (X-2)

In a vessel equipped with a thermometer, a nitrogen gas introducing pipe, and a stirrer and purged with nitrogen gas, 250 parts by mass of polycarbonate diol ("ETERNACOLL UH-200", manufactured by Ube Industries, Ltd.; number average molecular weight: 2,000), 18 parts by mass of DMPA, and 90 parts by mass of $H_{12}MDI$ were reacted at 70° C. in the presence of 236 parts by mass of methyl ethyl ketone until a point in time when the NCO % of the reaction product reached a predetermined NCO %, obtaining a methyl ethyl ketone solution of a urethane prepolymer having an isocyanate group at the end thereof.

Then, 16 parts by mass of triethylamine was added as a neutralizing agent to the above-obtained organic solvent solution of the urethane prepolymer and the resultant mixture was stirred, and further 797 parts by mass of water was added to the mixture, followed by stirring, to obtain an emulsion having the urethane prepolymer dispersed in water.

The obtained emulsion and 6.3 parts by mass of an aqueous extender chain solution containing 5.0 parts by mass of hydrazine were mixed with each other to cause a chain extension reaction, obtaining a water dispersion of a urethane resin (A-2). Then, the obtained water dispersion was subjected to desolvation to obtain an aqueous urethane resin composition (X-2) having a nonvolatile content of 35% by mass.

[Preparation Example 3] Preparation of Aqueous Polyurethane Composition (X-3)

In a vessel equipped with a thermometer, a nitrogen gas introducing pipe, and a stirrer and purged with nitrogen gas, 155 parts by mass of 1,6-hexanediol (hereinafter, abbreviated to "HG"), 137 parts by mass of neopentyl glycol, and 424 parts by mass of adipic acid were placed and melted at 120° C. Then, while stirring, the temperature of the melted mixture was increased to 220° C. over 3 to 4 hours, and retained for 5 hours, and then decreased to 150° C., and then 88 parts by mass of DMPA was added to the mixture, and, while stirring at 150° C., the temperature was retained for 5 to 10 hours, and then 300 parts by mass of methyl ethyl ketone was added to prepare a methyl ethyl ketone solution (X-3-a) of a polyester polyol having a carboxyl group, which solution has a nonvolatile content of 70% by mass.

In a vessel equipped with a thermometer, a nitrogen gas introducing pipe, and a stirrer and purged with nitrogen gas, 198 parts by mass of the above-prepared methyl ethyl ketone solution (X-3-a) of the polyester polyol having a carboxyl group, 160 parts by mass of polyester polyol ("CRISVON CMA-654", manufactured by DIC Corporation; number average molecular weight: 1,500), 19 parts by mass of HG, and 75 parts by mass of tolylene diisocyanate were reacted at 70° C. in the presence of 152 parts by mass of methyl ethyl ketone until a point in time when the NCO % of the reaction product reached a predetermined NCO %, obtaining a methyl ethyl ketone solution of a urethane prepolymer having an isocyanate group at the end thereof.

Then, 17.2 parts by mass of triethylamine was added as a neutralizing agent to the above-obtained organic solvent solution of the urethane prepolymer and the resultant mixture was stirred, and further 653 parts by mass of water and 7.7 parts by mass of piperazine were added to the mixture to cause a chain extension reaction, obtaining a water dispersion of a urethane resin (A-3). Then, the obtained water dispersion was subjected to desolvation to obtain an aqueous urethane resin composition (X-3) having a nonvolatile content of 40% by mass.

[Preparation Example 4] Preparation of Aqueous Polyurethane Composition (X'-1)

In a vessel equipped with a thermometer, a nitrogen gas introducing pipe, and a stirrer and purged with nitrogen gas, 1,000 parts by mass of polytetramethylene glycol (manufactured by Mitsubishi Chemical Corporation; number average molecular weight: 2,000), 50 parts by mass of "UNI-LUBE 75DE-60", manufactured by NOF Corporation (polyoxyethylene oxypropylene glycol; polyoxyethylene structure/polyoxypropylene structure (mass ratio)=75/25; number average molecular weight: about 3,000), 50 parts by mass of "UNILUBE 75 MB-900", manufactured by NOF Corporation (polyoxyethylene oxypropylene glycol monobutyl ether; polyoxyethylene structure/polyoxypropylene structure (mass ratio)=75/25; number average molecular weight: about 3,400), and 183 parts by mass of $H_{12}MDI$ were reacted at 70° C. in the presence of 1,283 parts by mass of methyl ethyl ketone until a point in time when the NCO % of the reaction product reached a predetermined NCO %, obtaining a methyl ethyl ketone solution of a urethane prepolymer having an isocyanate group at the end thereof.

Then, 2,566 parts by mass of water was added to the above-obtained organic solvent solution of the urethane prepolymer and the resultant mixture was stirred to obtain a water dispersion of an aqueous urethane resin. The obtained emulsion and 135 parts by mass of an aqueous chain extender solution containing 13.5 parts by mass of piperazine were mixed with each other to cause a chain extension reaction, obtaining a water dispersion of a urethane resin (A'-1). Then, the obtained water dispersion was subjected to desolvation to obtain an aqueous urethane resin composition (X'-1) having a nonvolatile content of 40% by mass.

Example 1

To 100 parts by mass of the aqueous urethane resin composition (X-1) was added 6.3 parts by mass of methyl cellulose ("METOLOSE SM-15", manufactured by Shin-Etsu Chemical Co., Ltd., which is, hereinafter, abbreviated to "MC") diluted with water at 10% by mass, and the resultant mixture was stirred using a mechanical mixer at 800 rpm for 10 minutes, and then deaerated using a centrifugal deaerator to prepare a blend. The blend (aqueous urethane resin composition containing a thickening agent) had a viscosity of 560 mPa·s. Further, the blend was applied to a release-treated polypropylene film using a knife coater. Subsequently, the resultant coated film was immersed in a 5% by mass aqueous solution of calcium nitrate for 3 minutes to coagulate the blend. Then, the resultant coagulate was exposed to running water for 5 hours to wash and remove the excess coagulant. Then, the coagulate was dried at 70° C. for 20 minutes and at 120° C. for 20 minutes to obtain a dried coagulate.

Examples 2 to 7 and Comparative Examples 1 to 4

Coagulates were individually prepared in substantially the same manner as in Example 1 except that the type of the aqueous urethane resin composition used and the type and amount of the thickening agent (B) were changed as shown in Tables 1 to 4.

[Method for Measuring an Average Particle Diameter of Aqueous Urethane Resin (A)]

With respect to each of the aqueous urethane resin compositions obtained in the Preparation Examples, using a laser diffraction/scattering-type particle size distribution measurement apparatus ("LA-910", manufactured by Horiba, Ltd.) and using water as a dispersing medium, an average particle diameter was measured at a relative refractive index of 1.10 wherein the particle diameter was measured on an area basis.

[Method for Measuring an Acid Value of Aqueous Urethane Resin (A)]

The aqueous urethane resin compositions obtained in the Preparation Examples were individually dried, and 0.05 to 0.5 g of the dried and solidified resin particles were weighed and placed in a 300 mL Erlenmeyer flask, and then about 80 mL of a mixed solvent of tetrahydrofuran and ion-exchanged water in a mass ratio [tetrahydrofuran/ion-exchanged water] of 80/20 was added to the resin particles to obtain a mixture of them.

Subsequently, a phenolphthalein indicator was mixed into the obtained mixture, and then the mixture was subjected to titration using a 0.1 mol/L aqueous solution of potassium hydroxide which had been preliminarily subjected to standardization. From the amount of the aqueous solution of potassium hydroxide used in the titration, an acid value (mg KOH/g) of the aqueous urethane resin (A) was determined according to the following formula (2) for calculation.

$$\text{Formula for calculation: } A = (B \times f \times 5.611)/S \qquad (2)$$

In the above formula, A is an acid value (mg KOH/g) of the resin in terms of solids, B is the amount (mL) of the 0.1 mol/L aqueous solution of potassium hydroxide used in the titration, f is a factor of the 0.1 mol/L aqueous solution of potassium hydroxide, S is the mass (g) of the resin particles, and 5.611 is the formula weight (56.11/10) of potassium hydroxide.

[Method for Evaluating the State of Formation of the Porous Structure of a Coagulate]

The coagulates obtained in the Examples and Comparative Examples were individually observed using Scanning electron microscope "SU3500", manufactured by Hitachi High-Technologies Corporation (magnification: 2,000 times) and evaluated as follows.

"T": A coagulate in which a number of pores are confirmed in the cross-sectional view of the urethane resin layer in an electron photomicrograph.

"F": A coagulate outside those mentioned above.

TABLE 1

|  | Example 1 | Example 2 | Example 3 |
|---|---|---|---|
| Aqueous urethane resin composition | (X-1) | (X-1) | (X-2) |
| Aqueous urethane resin (A) | (A-1) | (A-1) | (A-2) |
| Acid value (mg KOH/g) | 16 | 16 | 21 |

TABLE 1-continued

|  | Example 1 | Example 2 | Example 3 |
|---|---|---|---|
| Thickening agent (B) | MC | L75N | MC |
| Oxyethylene group content (mol/g) | 0 | $1.6 \times 10^{-2}$ | 0 |
| Amount (parts by mass) of thickening agent (B) incorporated (relative to 100 parts by mass of aqueous urethane resin (A)) | 2.1 | 2 | 1.7 |
| Viscosity of aqueous urethane resin composition after thickened (mPa · s) | 560 | 5,380 | 576 |
| Coagulant (C) Metal salt (c-1) | Aqueous solution of calcium nitrate | Aqueous solution of calcium nitrate | Aqueous solution of calcium nitrate |
| Evaluation method for state of formation of porous structure of coagulate | T | T | T |

TABLE 2

|  | Example 4 | Example 5 | Example 6 |
|---|---|---|---|
| Aqueous urethane resin composition | (X-3) | (X-1) | (X-1) |
| Aqueous urethane resin (A) | (A-3) | (A-1) | (A-1) |
| Acid value (mg KOH/g) | 18 | 16 | 16 |
| Thickening agent (B) | MC | MC | MC |
| Oxyethylene group content (mol/g) | 0 | 0 | 0 |
| Amount (parts by mass) of thickening agent (B) incorporated (relative to 100 parts by mass of aqueous urethane resin (A)) | 1.3 | 20 | 0.5 |
| Viscosity of aqueous urethane resin composition after thickened (mPa · s) | 498 | 840 | 448 |
| Coagulant (C) Metal salt (c-1) | Aqueous solution of calcium nitrate | Aqueous solution of calcium nitrate | Aqueous solution of calcium nitrate |
| Evaluation method for state of formation of porous structure of coagulate | T | T | T |

TABLE 3

|  | Example 7 | Comparative Example 1 | Comparative Example 2 |
|---|---|---|---|
| Aqueous urethane resin composition | (X-1) | (X-1) | (X'-1) |
| Aqueous urethane resin (A) | (A-1) | (A-1) | (A'-1) |
| Acid value (mg KOH/g) | 16 | 16 | 0 |
| Thickening agent (B) | MC | T10 | MC |
| Oxyethylene group content (mol/g) | 0 | $2.1 \times 10^{-2}$ | 0 |
| Amount (parts by mass) of thickening agent (B) incorporated (relative to 100 parts by mass of aqueous urethane resin (A)) | 2.1 | 0.8 | 2 |
| Viscosity of aqueous urethane resin composition after thickened (mPa · s) | 560 | 2,905 | 638 |
| Coagulant (C) Metal salt (c-1) | Methanol solution of calcium nitrate | Aqueous solution of calcium nitrate | Aqueous solution of calcium nitrate |
| Evaluation method for state of formation of porous structure of coagulate | T | F | F |

TABLE 4

|  | Comparative Example 3 | Comparative Example 4 |
|---|---|---|
| Aqueous urethane resin composition | (X-1) | (X-1) |
| Aqueous urethane resin (A) | (A-1) | (A-1) |
| Acid value (mg KOH/g) | 16 | 16 |
| Thickening agent (B) | MC | MC |
| Oxyethylene group content (mol/g) | 0 | 0 |
| Amount (parts by mass) of thickening agent (B) incorporated (relative to 100 parts by mass of aqueous urethane resin (A)) | 0.008 | 40 |
| Viscosity of aqueous urethane resin composition after thickened (mPa · s) | 327 | 957 |
| Coagulant (C) Metal salt (c-1) | Aqueous solution of calcium nitrate | Aqueous solution of calcium nitrate |
| Evaluation method for state of formation of porous structure of coagulate | F | F |

The abbreviations shown in Tables 1 to 4 are described below.

"L75N": "Borch Gel L75N", manufactured by Borchers GmbH (which contains a reaction product of 1,6-hexane diisocyanate, polyethylene glycol having a number average molecular weight of 3,000, and polyethylene glycol having a number average molecular weight of 6,000, polyoxyethylene distyrenated phenyl ether, acetylene glycol, and water (content: 50% by mass); oxyethylene group content: $1.6 \times 10^{-2}$ mol/g)

"T10": "Assistor T10", manufactured by DIC Corporation (which contains a reaction product of 1,6-hexane diisocyanate and polyethylene glycol having a number average molecular weight of 6,000, polyoxyethylene distyrenated phenyl ether, and water (content: 75% by mass); oxyethylene group content: $2.1 \times 10^{-2}$ mol/g)

Figure 1:
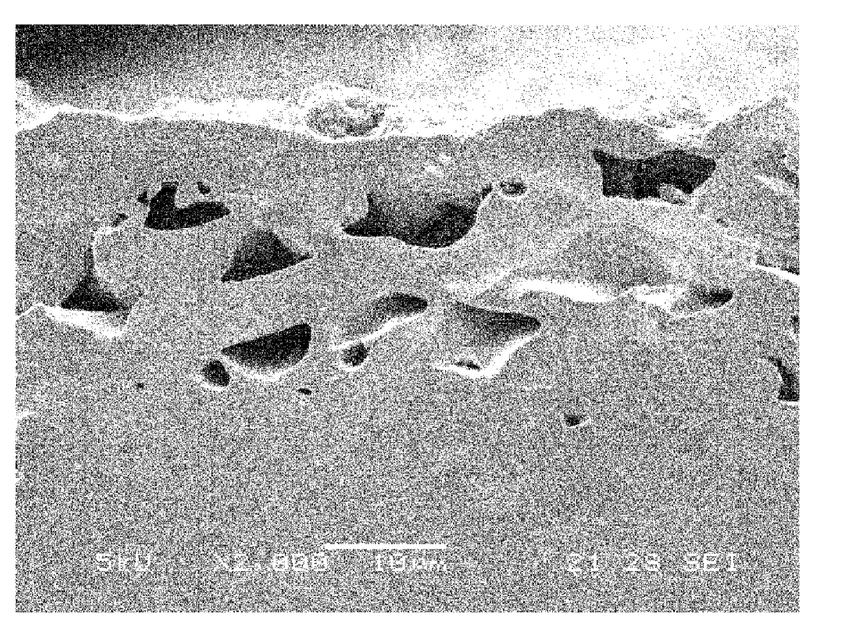
FIG. 1 shows an electron photomicrograph of the cross-sectional view of a coagulate obtained in Example 1.

As can be seen in FIG. 11, it has been found that a coagulate having a porous structure can be obtained by the method of the invention.

On the other hand, with respect to Comparative Example 1 that is an embodiment using, instead of the thickening agent (B), a thickening agent having an oxyethylene group content which is more than the range defined in the present invention, it has been found that the obtained coagulate has no porous structure formed.

With respect to Comparative Example 2 that is an embodiment using a nonionic urethane resin having no acid value instead of the aqueous urethane resin (A), any coagulate was not obtained.

With respect to Comparative Example 3 that is an embodiment in which the amount of the thickening agent (B) used is less than the range defined in the present invention, it has been found that the obtained coagulate has no porous structure formed. Further, a desired thickening effect was not obtained, and the application properties were markedly poor, and it was extremely difficult to prepare a uniform film.

With respect to Comparative Example 4 that is an embodiment in which the amount of the thickening agent (B) used is more than the range defined in the present invention, it has been found that the obtained coagulate has no porous structure formed. Further, the obtained film was so brittle that it could not be industrially used.

The invention claimed is:

1. A method for producing a coagulate, comprising:

incorporating, into an aqueous urethane resin composition containing an aqueous urethane resin having an acid value of 0.01 mg KOH/g or more, a thickening agent having an oxyethylene group content of $1.6 \times 10^{-2}$ mol/g or more and $2 \times 10^{-2}$ mol/g or less in an amount in the range of from 0.01 to 30 parts by mass, relative to 100 parts by mass of urethane resin in the aqueous urethane resin, to thicken the composition;

coagulating the thickened composition using a coagulant containing a metal salt consisting of calcium nitrate; and solidifying without subjecting the thickened composition to heating.

* * * * *